US008986886B2

(12) United States Patent
Park et al.

(10) Patent No.: US 8,986,886 B2
(45) Date of Patent: Mar. 24, 2015

(54) POSITIVE ACTIVE MATERIAL, METHOD OF PREPARING THE SAME, AND LITHIUM BATTERY INCLUDING THE POSITIVE ACTIVE MATERIAL

(75) Inventors: Do-Hyung Park, Yongin-si (KR); Chang-Hyuk Kim, Yongin-si (KR); Ji-Hyun Kim, Yongin-si (KR); Jeong-Seop Lee, Yongin-si (KR); Min-Han Kim, Yongin-si (KR); Seon-Young Kwon, Yongin-si (KR); Yoon-Chang Kim, Yongin-si (KR)

(73) Assignee: Samsung SDI Co., Ltd, Yongin-si, Gyeonggi-do (KR)

( * ) Notice: Subject to any disclaimer, the term of this patent is extended or adjusted under 35 U.S.C. 154(b) by 951 days.

(21) Appl. No.: 13/115,832

(22) Filed: May 25, 2011

(65) Prior Publication Data

US 2012/0015248 A1    Jan. 19, 2012

(30) Foreign Application Priority Data

Jul. 16, 2010    (KR) ........................ 10-2010-0069173

(51) Int. Cl.
| | | |
|---|---|---|
| H01M 4/13 | (2010.01) | |
| C01G 31/00 | (2006.01) | |
| C01G 45/12 | (2006.01) | |
| C01G 51/00 | (2006.01) | |
| C01G 53/00 | (2006.01) | |
| H01M 4/505 | (2010.01) | |
| H01M 4/525 | (2010.01) | |
| H01M 4/62 | (2006.01) | |
| H01M 4/131 | (2010.01) | |
| H01M 6/16 | (2006.01) | |
| H01M 10/0525 | (2010.01) | |
| H01M 10/42 | (2006.01) | |

(52) U.S. Cl.
CPC ............ *C01G 31/00* (2013.01); *C01G 45/1221* (2013.01); *C01G 45/1228* (2013.01); *C01G 45/1242* (2013.01); *C01G 51/42* (2013.01); *C01G 51/44* (2013.01); *C01G 51/50* (2013.01); *C01G 53/006* (2013.01); *C01G 53/42* (2013.01); *C01G 53/44* (2013.01); *C01G 53/50* (2013.01); *H01M 4/505* (2013.01); *H01M 4/525* (2013.01); *H01M 4/62* (2013.01); *C01P 2002/52* (2013.01); *C01P 2002/54* (2013.01); *C01P 2004/80* (2013.01); *C01P 2006/40* (2013.01); *H01M 4/131* (2013.01); *H01M 6/16* (2013.01); *H01M 10/0525* (2013.01); *H01M 10/4235* (2013.01); *Y02E 60/122* (2013.01); *C01P 2004/03* (2013.01)
USPC .................................... 429/231.3; 429/231.1

(58) Field of Classification Search
CPC ..... H01M 4/366; H01M 4/131; H01M 4/136; H01M 4/36; H01M 10/0525; H01M 2004/028; Y02E 60/122
USPC ........... 429/231.1, 231.3, 223, 224, 221, 220, 429/231.5, 231.6; 427/58
See application file for complete search history.

(56) References Cited

FOREIGN PATENT DOCUMENTS

| | | | |
|---|---|---|---|
| JP | 2005-190996 A | | 7/2005 |
| JP | 2006-073482 | * | 3/2006 |

(Continued)

OTHER PUBLICATIONS

Korean Registration Determination Certificate issued by the Korean Intellectual Property Office dated May 15, 2012, 5 pages.

*Primary Examiner* — Laura Weiner
(74) *Attorney, Agent, or Firm* — Knobbe Martens Olson & Bear LLP

(57) ABSTRACT

A positive active material, a method of preparing the same, and a lithium battery including the same.

6 Claims, 2 Drawing Sheets

(56) References Cited

FOREIGN PATENT DOCUMENTS

| JP | 2006-73482 A | 3/2006 |
| JP | 2007-48525 A | 2/2007 |
| JP | 2010-080394 | 4/2010 |
| KR | 1020040073076 A | 8/2004 |

* cited by examiner

POSITIVE ACTIVE MATERIAL, METHOD OF PREPARING THE SAME, AND LITHIUM BATTERY INCLUDING THE POSITIVE ACTIVE MATERIAL

CROSS-REFERENCE TO RELATED APPLICATIONS

This application claims the benefit of Korean Patent Application No. 10-2010-0069173, filed on Jul. 16, 2010, in the Korean Intellectual Property Office, the disclosure of which is incorporated herein in its entirety by reference.

BACKGROUND

1. Field

One or more embodiments relate to a positive active material, a method of preparing the same, and a lithium battery including the positive active material.

2. Description of the Related Technology

Among batteries that convert chemical energy generated by an electrochemical redox reaction between chemical materials into electrical energy, a lithium battery includes a positive electrode, a negative electrode, and an electrolyte.

High-performing electronic devices are developed and thus demand for a lithium battery that has a high capacity and is able to be used at a high voltage is increasing. In response to the increasing demand, various positive active materials are developed in consideration of various performances. The present embodiments provide improvement in charge and discharge efficiency and lifetime characteristics as well as other advantages.

SUMMARY

One or more embodiments include a positive active material having a novel structure.

One or more embodiments include a method of preparing the positive active material.

One or more embodiments include a lithium battery including the positive active material.

Additional aspects will be set forth in part in the description which follows and, in part, will be apparent from the description, or may be learned by practice of the presented embodiments.

According to one or more embodiments, a positive active material includes lithium sulfate and a core that includes a collection of primary particles, each of which is a compound including Ni, Li, and a first element, wherein the first element includes one selected from the group consisting of cobalt (Co), manganese (Mn), aluminum (Al), chromium (Cr), iron (Fe), magnesium (Mg), strontium (Sr), vanadium (V), lanthanum (La), cerium (Ce), strontium (Sr), titanium (Ti), molybdenum (Mo), yttrium (Y), copper (Cu), oxygen (O), fluorine (F), sulfur (S), phosphorus (P), and a combination thereof, and the amount of the lithium sulfate is from about 0.01 parts by weight to about 0.5 parts by weight based on 100 parts by weight of the core.

The amount of the lithium sulfate may be from about 0.1 parts by weight to about 0.3 parts by weight based on 100 parts by weight of the core.

The lithium sulfate may be present in a particle form and the lithium sulfate particles exist among the primary particles of the core.

The compound including Ni, Li, and the first element may be represented by Formula 1 below:

$$Li_x(Ni_pCo_qMn_r)O_y$$ <Formula 1> wherein, $0.95 \leq x \leq 1.05$, $0 < p < 1$, $0 < q < 1$, $0 < r < 1$, $p+q+r=1$, and $0 < y \leq 2.025$.

$1 \leq x \leq 1.05$, $0.5 \leq p \leq 0.6$, $0.2 \leq q \leq 0.3$, and $0.1 \leq r \leq 0.3$. $x=1$, $p=0.5$, $q=0.2$, $r=0.3$, and $y=2$, or $x=1.05$, $p=0.6$, $q=0.2$, $r=0.2$, and $y=2$.

According to one or more embodiments, a method of preparing a positive active material includes preparing a first mixture by mixing and first-heat-treating an Ni-containing compound, an Li-containing compound, and a first element-containing compound; and mixing and second-heat-treating the first mixture and at least one sulfur-containing compound selected from the group consisting of lithium sulfate and sulfur, wherein the positive active material includes: lithium sulfate and a core that includes of a collection of primary particles, each of which is a compound including Ni, Li, and the first element, and the amount of the lithium sulfate is from about 0.01 parts by weight to about 0.5 parts by weight based on 100 parts by weight of the core, and the first element includes one selected from the group consisting of Co, Mn, Al, Cr, Fe, Mg, V, La, Ce, Sr, Ti, Mo, Y, Cu, O, F, S, P, and a combination thereof.

The Ni-containing compound may be a compound selected from the group consisting of an Ni sulfate, an Ni nitrate, and an Ni chlorinated material, and the first element-containing compound is a compound selected from the group consisting of a first element-containing sulfate, a first element-containing nitrate, and a first element-containing chlorinated material.

The Ni-containing compound may include $NiSO_4 \cdot xH_2O$, and the first element-containing compound includes $CoSO_4 \cdot xH_2O$ and $MnSO_4 \cdot xH_2O$.

The first heat treatment may be performed by increasing a temperature of a mixture of the Ni-containing component, the Li-containing compound and the first element-containing compound to a first heat treatment temperature of about 800° C. to about 1000° C. at a first temperature increase rate of about 1° C./min to about 3° C./min, and maintaining the first heat treatment temperature for about 5 hours to about 20 hours.

When the first mixture may be mixed with the sulfur-containing compound, the amount of the sulfur-containing compound may be from about 0.01 parts by weight to about 0.5 parts by weight based on 100 parts by weight of the first mixture.

The second heat treatment may be performed by increasing a temperature of a mixture of the first mixture and at least one surface-containing compound to a second heat treatment temperature of about 400° C. to about 700° C. at a second temperature increase rate of about 1° C./min to about 3° C./min and maintaining the second heat treatment temperature for about 1 hour to about 5 hours.

The first heat treatment and the second heat treatment may be each independently performed in atmospheric air or an oxygen atmosphere.

According to one or more embodiments, a method of preparing a positive active material, the method comprising: mixing and third-heat-treating an Ni-containing compound, an Li-containing compound, an first element-containing compound, and at least one sulfur-containing compound selected from the group consisting of lithium sulfate and sulfur, wherein the positive active material may include: lithium sulfate and a core that comprises of a collection of primary particles, each of which is a compound comprising Ni, Li, and the first element, and the amount of the lithium sulfate is from about 0.01 parts by weight to about 0.5 parts by weight based on 100 parts by weight of the core, and the first element may include one selected from the group consisting of Co, Mn, Al, Cr, Fe, Mg, Sr, V, La, Ce, Ti, Mo, Y, Cu, O, F, S, P, and a combination thereof.

The third heat treatment may be performed by increasing a temperature of a mixture of the Ni-containing component, the Li-containing compound, the first element-containing compound and at least one surface-containing compound to a third heat treatment temperature of about 400° C. to about 1000° C. at a third temperature increase rate of about 1° C./min to about 3° C./min, and maintaining the third heat treatment temperature for about 1 hour to about 20 hours.

According to one or more embodiments, a lithium battery includes a positive electrode comprising the positive active material; a negative electrode comprising a negative active material; and an electrolyte.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
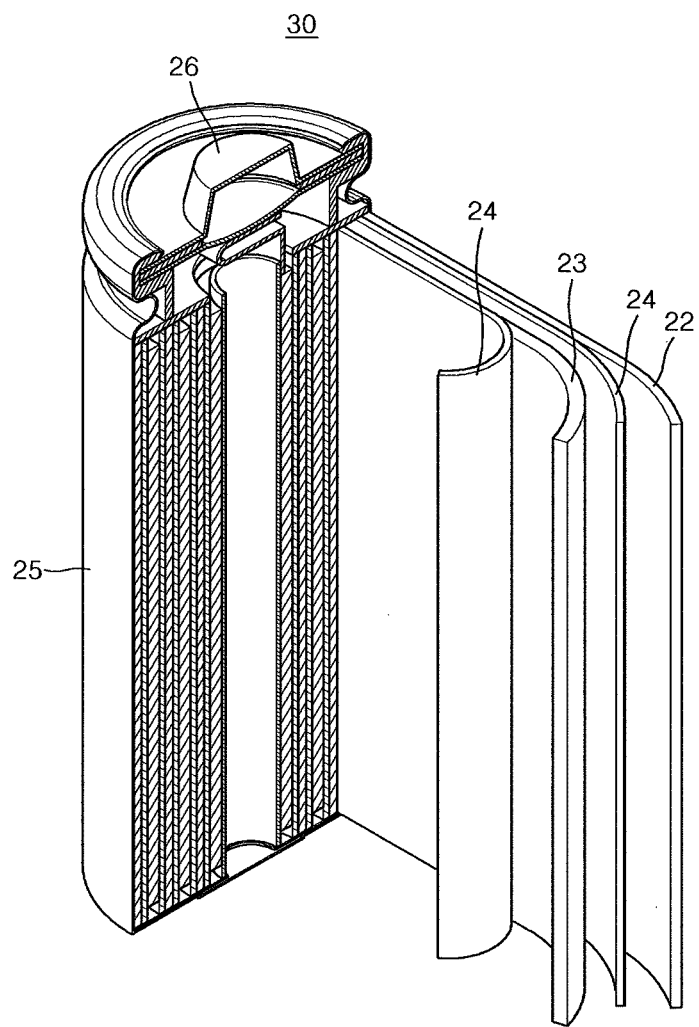
FIG. 1 is a perspective schematic view of a lithium battery according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

A positive active material according to an embodiment includes a core and lithium sulfate.

The core includes a collection of primary particles, each of which is a compound including nickel (Ni), lithium (Li), and a first element. For example, the core may be an agglomerate that includes a plurality of the primary particles. Each primary particle may have, for example, a spherical shape or an egg-shape. An average of longer diameters of the primary particles may be variant according to manufacturing conditions of the positive active material, and may be, for example, from about 0.1 μm to about 2 μm.

The first element may include one selected from the group consisting of cobalt (Co), manganese (Mn), aluminum (Al), chromium (Cr), iron (Fe), magnesium (Mg), strontium (Sr), vanadium (V), lanthanum (La), cerium (Ce), titanium (Ti), molybdenum (Mo), yttrium (Y), copper (Cu), oxygen (O), fluorine (F), sulfur (S), phosphorus (P), and a combination thereof. The first element may vary according to a performance of a target positive active material. For example, the first element may include Co, Mn, and O, but is not limited thereto.

The inclusion of the lithium sulfate in the positive active material leads to an improvement in high capacity characteristics and thermal stability of the positive active material.

The amount of the lithium sulfate may be from about 0.01 parts by weight to about 0.5 parts by weight, for example, about 0.1 parts by weight to about 0.5 parts by weight, based on 100 parts by weight of the core. For example, the amount of the lithium sulfate may be from about 0.1 parts by weight to about 0.3 parts by weight based on 100 parts by weight of the core.

When the amount of the lithium sulfate is within the ranges described above, the high capacity characteristics and the thermal stability of the positive active material may be effectively improved. Accordingly, a lithium battery including the positive active material may have a long lifetime, and excellent charge and discharge efficiency.

In the positive active material, the lithium sulfate may be present as particles. For example, the lithium sulfate as particles may be present on a surface of the core. Alternatively, for example, the lithium sulfate particles may be present among the primary particles of the core. However, the location of the lithium sulfate particles is not limited thereto.

The compound including Ni, Li, and the first element may be represented by Formula 1:

$$Li_x(Ni_pCo_qMn_r)O_y \qquad \text{<Formula 1>}$$

In some embodiments of Formula 1, $0.95 \leq x \leq 1.05$, $0 < p < 1$, $0 < q < 1$, $0 < r < 1$, $p+q+r=1$, and $0 < y \leq 2.025$.

In other embodiments of Formula 1, $1 \leq x \leq 1.05$, $0.5 \leq p \leq 0.6$, $0.2 \leq q \leq 0.3$, and $0.1 \leq r \leq 0.3$.

For example, in Formula 1, $x=1$, $p=0.5$, $q=0.2$, $r=0.3$, and $y=2$, or $x=1.05$, $p=0.6$, $q=0.2$, $r=0.2$, and $y=2$, but $x$, $p$, $q$, and $r$ are not limited thereto.

The compound including Ni, Li, and the first element may also be represented by any one of Formulae 2 to 23, but is not limited thereto:

$$Li_aA_{1-b}X_bD_2 \text{ wherein } 0.95 \leq a \leq 1.1, \text{ and } 0 \leq b \leq 0.5; \qquad \text{<Formula 2>}$$

$$Li_aE_{1-b}X_bO_{2-c}D_c \text{ wherein } 0.95 \leq a \leq 1.1, 0 \leq b \leq 0.5, \text{ and } 0 \leq c \leq 0.05; \qquad \text{<Formula 3>}$$

$$LiE_{2-b}X_bO_{4-c}D_c \text{ wherein } 0 \leq b \leq 0.5, \text{ and } 0 \leq c \leq 0.05; \qquad \text{<Formula 4>}$$

$$Li_aNi_{1-b-c}Co_bB_cD_\alpha \text{ wherein } 0.95 \leq a \leq 1.1, 0 \leq b \leq 0.5, 0 \leq c \leq 0.05, \text{ and } 0 < \alpha \leq 2; \qquad \text{<Formula 5>}$$

$$Li_aNi_{1-b-c}Co_bX_cO_{2-\alpha}M_\alpha \text{ wherein } 0.95 \leq a \leq 1.1, 0 \leq b \leq 0.5, 0 \leq c \leq 0.05, \text{ and } 0 < \alpha < 2; \qquad \text{<Formula 6>}$$

$$Li_aNi_{1-b-c}Co_bX_cO_{2-\alpha}M_2 \text{ wherein } 0.95 \leq a \leq 1.1, 0 \leq b \leq 0.5, 0 \leq c \leq 0.05, \text{ and } 0 < \alpha < 2; \qquad \text{<Formula 7>}$$

$$Li_aNi_{1-b-c}Mn_bX_cD_\alpha \text{ wherein } 0.95 \leq a \leq 1.1, 0 \leq b \leq 0.5, 0 \leq c \leq 0.05, \text{ and } 0 < \alpha \leq 2; \qquad \text{<Formula 8>}$$

$$Li_aNi_{1-b-c}Mn_bX_cO_{2-\alpha}M_\alpha \text{ wherein } 0.95 \leq a \leq 1.1, 0 \leq b \leq 0.5, 0 \leq c \leq 0.05, \text{ and } 0 < \alpha < 2; \qquad \text{<Formula 9>}$$

$$Li_aNi_{1-b-c}Mn_bX_cO_{2-\alpha}M_2 \text{ wherein } 0.95 \leq a \leq 1.1, 0 \leq b \leq 0.5, 0 \leq c \leq 0.05, \text{ and } 0 < \alpha < 2; \qquad \text{<Formula 10>}$$

$$Li_aNi_bE_cG_dO_2 \text{ wherein } 0.90 \leq a \leq 1.1, 0 \leq b \leq 0.9, 0 \leq c \leq 0.5, \text{ and } 0.001 \leq d \leq 0.1; \qquad \text{<Formula 11>}$$

$$Li_aNi_bCo_cMn_dG_eO_2 \text{ wherein } 0.90 \leq a \leq 1.1, 0 \leq b \leq 0.9, 0 \leq c \leq 0.5, 0 \leq d \leq 0.5, \text{ and } 0.001 \leq e \leq 0.1; \qquad \text{<Formula 12>}$$

$$Li_aNiG_bO_2 \text{ wherein } 0.90 \leq a \leq 1.1, \text{ and } 0.001 \leq b \leq 0.1; \qquad \text{<Formula 13>}$$

$$Li_aCoG_bO_2 \text{ wherein } 0.90 \leq a \leq 1.1, \text{ and } 0.001 \leq b \leq 0.1; \qquad \text{<Formula 14>}$$

$$Li_aMnG_bO_2 \text{ wherein } 0.90 \leq a \leq 1.1, \text{ and } 0.001 \leq b \leq 0.1; \qquad \text{<Formula 15>}$$

$$Li_aMn_2G_bO_4 \text{ wherein } 0.90 \leq a \leq 1.1, \text{ and } 0.001 \leq b \leq 0.1; \qquad \text{<Formula 16>}$$

$$LiQS_2; \qquad \text{<Formula 17>}$$

$$LiV_2O_5; \qquad \text{<Formula 18>}$$

$LiZO_2$; <Formula 19>

$LiNiVO_4$; <Formula 20>

$Li_{(3-f)}J_2(PO_4)_3$ (0≤f≤2); <Formula 21>

$Li_{(3-f)}Fe_2(PO_4)_3$ (0≤f≤2); and <Formula 22>

$LiFePO_4$. <Formula 23>

In Formulae 2 through 23, A is selected from the group consisting of Ni, Co, Mn, and a combination thereof, but is not limited thereto; X is selected from the group consisting of Al, Ni, Co, Mn, Cr, Fe, Mg, Sr, V, a rare-earth element, and a combination thereof, but is not limited thereto; D is selected from the group consisting of O, F, S, P, and a combination thereof, but is not limited thereto; E is selected from the group consisting of Co, Mn, and a combination thereof, but is not limited thereto; M is selected from the group consisting of F, S, P, and a combination thereof, but is not limited thereto; G is selected from the group consisting of Al, Cr, Mn, Fe, Mg, La, Ce, Sr, V, and a combination thereof, but is not limited thereto; Q is selected from the group consisting of Ti, Mo, Mn, and a combination thereof, but is not limited thereto; Z is selected from the group consisting of Cr, V, Fe, Sc, Y, and a combination thereof, but is not limited thereto; and J is selected from the group consisting of V, Cr, Mn, Co, Ni, Cu, and a combination thereof, but is not limited thereto.

A method of preparing the positive active material according to an embodiment includes preparing a first mixture by mixing and first-heat-treating an Ni-containing compound, an Li-containing compound, and a first element-containing compound; and mixing and second-heat-treating the first mixture and at least one sulfur-containing compound selected from the group consisting of lithium sulfate and sulfur. The positive active material prepared by using this method includes lithium sulfate and the core including the primary particles, each of which is a compound containing Ni, Li, and a first element, wherein the amount of the lithium sulfate is from about 0.01 parts by weight to about 0.5 parts by weight based on 100 parts by weight of the core.

The Ni-containing compound may be a compound selected from the group consisting of an Ni sulfate, an Ni nitrate, and an Ni chlorinated material.

The first element of the first element-containing compound has been described above. Since the first element can be a combination of two or more different elements, the first element-containing compound may also be a combination of two or more different compounds. For example, if the first element includes Mn and Co, the first element-containing compound may include an Mn-containing compound and a Co-containing compound.

The first element-containing compound may be selected from the group consisting of a first element-containing sulfate, a first element-containing nitrate, and a first element-containing chlorinated material.

For example, the Ni-containing compound may be an Ni-containing sulfate and the first element-containing compound may be a first element-containing sulfate. If the first element includes Mn and Co, the Ni-containing compound may be $NiSO_4 \cdot xH_2O$ and the first element-containing compound may include $CoSO_4 \cdot xH_2O$ as a Co-containing compound and $MnSO_4 \cdot xH_2O$ as an Mn-containing compound. $NiSO_4 \cdot xH_2O$, $CoSO_4 \cdot xH_2O$, and $MnSO_4 \cdot xH_2O$ are respectively prepared by synthesizing Ni sulfide, Co sulfide, and Mn sulfide in a hydrate form by known co-precipitation methods.

The first heat treatment may be performed as follows: increasing the temperature of the mixture including the Ni-containing compound, the Li-containing compound, and the first element-containing compound to a first heat treatment temperature of about 800° C. to about 1000° C. (for example, about 900° C. to about 1000° C.) at a first temperature increase rate of about 1° C./min to about 3° C./min (for example, about 1.5° C./min to about 2.5° C./min), and maintaining the first heat treatment temperature for about 5 hours to about 20 hours (for example, about 10 hours to about 15 hours). By satisfying the first heat treatment conditions as described above, the first mixture, that is, the core including the primary particles, having excellent capacity characteristics and charge and discharge efficiency may be obtained.

Then, the first mixture is mixed with the sulfur-containing compound and the mixture is second-heat-treated. The sulfur-containing compound may be lithium sulfate, sulfur, or a mixture of lithium sulfate and sulfur. When the first mixture (that is, the core) is mixed with the sulfur-containing compound, the amount of the sulfur-containing compound used may be from about 0.01 parts by weight to about 0.5 parts by weight, for example, about 0.1 parts by weight to about 0.5 parts by weight (for example, about 0.1 parts by weight to about 0.3 parts by weight), based on 100 parts by weight of the first mixture, but is not limited thereto. If the amount of the sulfur-containing compound is within the ranges described above, a positive active material prepared using this method may include lithium sulfate in an amount within the ranges described above.

The second heat treatment may be performed as follows: increasing a temperature of the mixture including the first mixture and the sulfur-containing compound to a second heat treatment temperature of about 400° C. to about 700° C. (for example, about 500° C. to about 700° C.) at a second temperature increase rate of about 1° C./min to about 3° C./min (for example, about 1.5° C./min to about 2.5° C./min) and maintaining the mixture including the sulfur-containing compound at the second heat treatment temperature for about 1 hour to about 5 hours (for example, about 2 hours to about 4 hours). By satisfying the second heat treatment conditions, adhesive characteristics between lithium sulfate and the core may be improved and a positive active material prepared using this method may have high thermal stability.

For example, by controlling the second heat treatment temperature, the amount of the lithium sulfate in a positive active material prepared using this method may be additionally controlled. Although the melting point of lithium sulfate is about 859° C., when lithium sulfate is heat treated with an oxide, the lithium sulfate may react with a surrounding material, which may be oxygen, at a temperature lower than the melting point described above. For example, if the second heat treatment temperature is 700° C., at least a portion of lithium sulfate mixed with the first mixture prior to the second heat treatment (for example, about 50 weight % of lithium sulfate mixed with the first mixture prior to the second heat treatment) may be removed by the second heat treatment.

For example, when the sulfur-containing compound is mixed with the first mixture, that is, the core, at 0.5 parts by weight based on 100 parts by weight of the first mixture and then the mixture is second-heat-treated at 700° C., the amount of residual lithium sulfate when the second heat treatment is finished may be about 0.25 parts by weight based on 100 parts by weight of the first mixture.

The first heat treatment and the second heat treatment may each be independently performed in a condition selected from the group consisting of atmospheric air and an oxygen atmosphere. When the first heat treatment and the second heat treatment are performed in either of the conditions described above, a positive active material prepared using this method has excellent electrochemical characteristics (for example, excellent charge and discharge efficiency).

Alternatively, a method of preparing the positive active material according to another embodiment may include mixing and third-heat-treating an Ni-containing compound, an Li-containing compound, a first element-containing compound, and at least one sulfur-containing compound selected from the group consisting of lithium sulfate (and sulfur). The positive active material obtained by using this method may include a core that consists of a collection of primary particles, each of which is a compound including Ni, Li, and a first element and lithium sulfate, wherein the amount of the lithium sulfate is from about 0.01 parts by weight to about 0.5 parts by weight based on 100 parts by weight of the core, and the first element includes one selected from the group consisting of Co, Mn, Al, Cr, Fe, Mg, V, La, Ce, Sr, Ti, Mo, Y, Cu, O, F, S, P, and a combination thereof.

Detailed descriptions about the Ni-containing compound, the Li-containing compound, and the first element-containing compound have been presented above.

The third heat treatment may be performed as follows: increasing a temperature of the mixture including the Ni-containing compound, the Li-containing compound, the first element-containing compound, and the at least one sulfur-containing compound to a third heat treatment temperature of about 400° C. to about 1000° C. (for example, about 600° C. to about 800° C.) at a third temperature increase rate of about 1° C./min to about 3° C./min (for example, about 1.5° C./min to about 2.5° C./min), and maintaining the third heat treatment temperature for about 1 hour to about 20 hours (for example, about 5 hours to about 20 hours).

The third heat treatment may be performed in atmospheric air or an oxygen atmosphere. If the third heat treatment is performed as described above, a positive active material prepared using this method has excellent electrochemical characteristics (for example, excellent charge and discharge efficiency).

The positive active material according to any of the pervious embodiments may be used in a lithium battery. Accordingly, a lithium battery including a positive electrode including the positive active material, a negative electrode, and an electrolyte is provided.

The lithium battery may be, for example, a secondary lithium battery such as a lithium ion battery, a lithium ion polymer battery, or a lithium sulfur battery or a primary lithium battery, but the type of the lithium battery is not limited thereto.

The positive electrode may include a current collector and a positive active material layer formed on the current collector. An example of a method of manufacturing the positive electrode will now be described in detail. First, a positive active material composition for forming a positive active material layer including the positive active material described above, a binder, and a solvent is prepared. Then, the positive active material composition is directly coated on a current collector (for example, an aluminum current collector) and dried to form a positive active material layer, thereby manufacturing a positive electrode plate. Alternatively, the positive active material composition may be cast on a separate substrate and a film separated from the separate substrate is laminated as a positive active material layer on a current collector, thereby manufacturing a positive electrode plate. The methods of manufacturing a positive electrode described above are well known in the art and thus will not be described in detail. The solvent may be N-methylpyrrolidone, acetone, or water, but is not limited thereto.

The positive active material layer may further include, in addition to the positive active material described above, at least one commercially available positive active material. The commercially available positive active material may represented by any of Formulae 2 to 23. Meanwhile, a coating layer may be further selectively formed on a surface of the commercially available positive active material. For example, the coating layer may include at least one coating element compound selected from the group consisting of an oxide, a hydroxide, an oxyhydroxide, an oxycarbonate, and a hydroxycarbonate of a coating element. The coating layer may consist of an amorphous or crystalline compound. The coating element compound included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof, but is not limited thereto.

The coating layer may be formed using any of the coating element compounds described above and according to any of various coating methods that do not adversely affect properties of the positive active material. For example, spray coating or precipitation may be used to form the coating layer. The coating methods described above are well known in the art and thus will not be described in detail herein.

The binder included in the positive active material layer allows positive active material particles to attach to each other and attaches the positive active material to the current collector. Examples of the binder include polyvinyl alcohol, carboxymethyl cellulose, hydroxypropyl cellulose, diacetyl cellulose, polyvinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, styrene butadiene rubber, acrylated styrene-butadiene rubber, epoxy resin, and nylon. However, the binder is not limited thereto.

The positive active material layer may further include a conducting agent. The conducting agent provides a conductive property to an electrode and may be any material that does not induce a chemical change in a formed battery and is electronically conductive. Examples of the conducting agent include a carbonaceous material, such as natural graphite, artificial graphite, carbon black, acetylene black, ketjen black, or carbon fiber; a metallic material, such as metal power or metal fiber of copper, nickel, aluminum, or silver; a conductive polymer such as polyphenylene derivative; and a mixture thereof.

The current collector may comprise aluminum, but is not limited thereto.

Like in the manufacturing of the positive electrode plate described above, a negative active material, a conducting agent, a binder, and a solvent are mixed to prepare a negative active material composition, and the prepared negative active material composition is directly coated on a current collector (for example, a copper current collector) or cast onto a separate support and a negative active material film separated from the separate support is laminated on a copper current collector, thereby manufacturing a negative electrode plate. In this regard, amounts of the negative active material, the conducting agent, the binder, and the solvent may be amounts used in a conventional lithium battery.

The negative active material may be natural graphite, silicon/carbon composite ($SiO_x$), silicon, a silicon thin film, lithium metal, lithium alloy, a carbonaceous material, or graphite. The conducting agent, the binder, and the solvent used in the negative active material composition may be the same as those used in the positive electrode. In an embodiment, a plasticizer may be further added to the positive active material composition and the negative active material composition to form pores in the electrode plates.

According some embodiments of the lithium battery, a separator may be present between the positive electrode and the negative electrode. The separator may be any separator that is used in a lithium battery. For example, the separator may be a material that has a low resistance to migration of ions of an electrolyte and an excellent electrolyte-retaining capability. For example, the separator may include a material selected from the group consisting of glass fiber, polyester, Teflon, polyethylene (PE), polypropylene, polytetrafluoroethylene (PTFE), and a combination thereof, each of which may be nonwoven or woven. For example, a separator for use in a lithium ion battery may be a foldable separator comprising polyethylene or polypropylene, and a separator for use in a lithium ion polymer battery may be a separator having an excellent organic electrolyte retaining capability. An example of a method of manufacturing the separator will now be described in detail.

A separator composition is prepared by mixing a polymer resin, a filler, and a solvent. The separator composition may be directly coated and dried on an electrode, thereby forming a separator. Alternatively, the separator composition is cast and dried on a support as a film and then the separator film separated from the support is laminated on an electrode, thereby forming a separator.

A polymer resin that is used to produce the separator may be any material that is used in a binder of an electrode plate. For example, the polymer resin may be a vinylidene fluoride/hexafluoropropylene copolymer, polyvinylidene fluoride, polyacrylonitrile, polymethylmethacrylate, or a combination thereof. For example, the polymer resin may be a vinylidene fluoride/hexafluoropropylene copolymer in which the amount of hexafluoropropylene is from about 8 to about 25 weight % of the vinylidene fluoride/hexafluoropropylene copolymer.

The separator is disposed between the positive electrode plate and the negative electrode plate to form a battery assembly. The battery assembly is wound or folded and accommodated in a cylindrical battery case or a rectangular battery case, and then an electrolyte is loaded thereto, thereby completing manufacturing of a lithium ion battery. Meanwhile, in order to manufacture a lithium ion polymer battery, a plurality of the battery assemblies are stacked on one another in a bi-cell structure, immersed in an organic electrolyte, and then the obtained product is housed in a pouch and sealed.

The electrolyte may include a non-aqueous organic solvent and a lithium salt.

In the electrolyte, the non-aqueous organic solvent may function as a medium in which ions participating in an electrochemical reaction in a lithium battery migrate.

Examples of the non-aqueous organic solvent include a carbonate-based solvent, an ester-based solvent, an ether-based solvent, a ketone-based solvent, an alcohol-based solvent, and a non-proton type solvent.

Examples of a carbonate-based solvent include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), and butylene carbonate (BC), but the non-aqueous organic solvent is not limited thereto.

Examples of an ester-based solvent include methyl acetate, ethyl acetate, n-propyl acetate, dimethylacetate, methylpropionate, ethylpropionate, γ-butyrolactone, decanolide, valerolactone, mevalonolactone, and caprolactone, but the non-aqueous organic solvent is not limited thereto.

Examples of an ether-based solvent include dibutyl ether, tetraglyme, diglyme, dimethoxyethane, 2-methyltetrahydrofuran, and tetrahydrofuran, but the non-aqueous organic solvent is not limited thereto.

Examples of a ketone-based solvent include cyclohexanone, but the non-aqueous organic solvent is not limited thereto.

Examples of an alcohol-based solvent include ethyl alcohol and isopropyl alcohol, but the non-aqueous organic solvent is not limited thereto.

Examples of a non proton-type solvent include nitriles such as R—CN (R is a linear, branched, or cyclic $C_2$ to $C_{20}$ hydrocarbonate group and has a double bond, aromatic ring, or ether bond), amides such as dimethylformamide, dioxolanes such as 1,3-dioxolane, and sulfolanes, but the non-aqueous organic solvent is not limited thereto.

The non-aqueous organic solvent may be a single solvent or a mixture of two or more solvents. When the non-aqueous organic solvent is a mixture of two or more solvents, a mixture ratio of the solvents may be appropriately controlled according to battery performance, which is well known in the art.

For example, the non-aqueous organic solvent may be a mixture including ethylene carbonate (EC), ethylmethyl carbonate (EMC), and dimethyl carbonate (DMC) (in a volumetric ratio of 1:1:1), but is not limited thereto.

In the electrolyte, the lithium salt is dissolved in the non-aqueous organic solvent, functions as a lithium ion supplier in the lithium battery, enables a basic operation of the lithium battery, and facilitates migration of lithium ions between the positive electrode and the negative electrode.

For example, the lithium salt may include at least one supporting electrolytic salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiCl, LiI, and $LiB(C_2O_4)_2$(lithium bis(oxalato) borate (LiBOB)).

The concentration of the lithium salt may be from about 0.1 M to about 2.0 M, for example, about 0.6 M to about 2.0 M. When the concentration of the lithium salt is within the ranges described above, the electrolyte obtains appropriate conductivity and viscosity and lithium ions may effectively migrate.

The electrolyte may further include an additive for improving low-temperature characteristics and/or high-temperature swelling characteristics of a lithium battery. The additive may be, for example, a carbonate-based material.

For example, the carbonate-based material is selected from the group consisting of vinylene carbonate (VC); a vinylene carbonate derivative having at least one substituent selected from the group consisting of halogen (for example, —F, —Cl, —Br, —I etc.), cyano (CN), and nitro ($NO_2$); and an ethylene carbonate derivative having at least one substituent selected from the group consisting of halogen (for example, —F, —Cl, —Br, —I etc.), cyano (CN), and nitro ($NO_2$), but is not limited thereto.

The additive may be one kind of material or a mixture of at least two kinds of materials.

For example, the electrolyte may further include an additive selected from the group consisting of vinylene carbonate (VC) and fluoroethylene carbonate (FEC).

FIG. 1 is a perspective schematic view of a lithium battery 30 according to an embodiment. Referring to FIG. 1, the lithium battery 30 includes a positive electrode 23, a negative electrode 22, a separator 24 interposed between the positive electrode 23 and the negative electrode 22, an electrolyte (not shown) with which the positive electrode 23, the negative electrode 22, and the separator 24 are impregnated, a battery container 25, and an encapsulation member 26 for sealing the battery container 25. For example, the positive electrode 23, the negative electrode 22, and the separator 24 are sequentially stacked on one another and the stack structure is rolled and placed in the battery container 25, thereby completing manufacturing of the lithium battery 30.

The present embodiments will be described in further detail with reference to the following examples. The following examples are for illustrative purposes only and are not intended to limit the scope of the embodiments.

EXAMPLES

Synthesis Example 1

$Li_2Co_3$ was used as an Li-containing compound, $NiSO_4.xH_2O$ was used as an Ni-containing compound, $CoSO_4.xH_2O$ was used as a Co-containing compound, $MnSO_4.xH_2O$ was used as an Mn-containing compound (the Co-containing compound and the Mn-containing compound constituted a first element-containing compound.) $NiSO_4.xH_2O$, $CoSO_4.xH_2O$, and $MnSO_4.xH_2O$ were respectively prepared by synthesizing Ni sulfide, Co sulfide, and Mn sulfide in a hydrate form by co-precipitation.

Figure 2A:
FIGS. 2A and 2B are scanning electron microscopy (SEM) images of a positive active material prepared according to Synthesis Example 1.
Figure 2B:
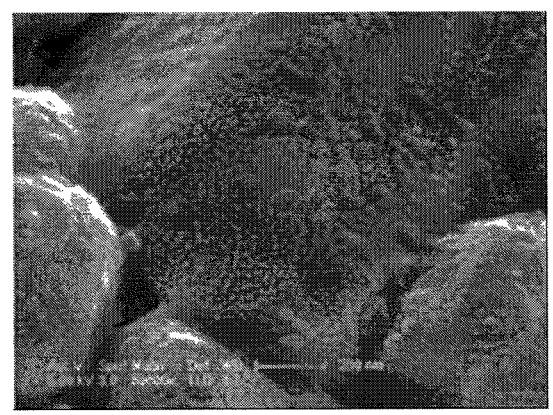

$Li_2CO_3$, $NiSO_4.xH_2O$, $CoSO_4.xH_2O$, and $MnSO_4.xH_2O$ were mixed in such amounts until a mole ratio of Li:Ni:Co:Mn became 1.05:0.6:0.2:0.2, and then in atmospheric air, the temperature of the mixture was increased to 950° C. (at a temperature increase rate of 2° C./min) and the temperature was maintained at 950° C. for 10 hours to perform a first heat treatment process and obtain a first mixture. The first mixture was mixed with a lithium sulfate (in this regard, the amount of the lithium sulfate mixed with the resulting mixture was 0.1 parts by weight based on 100 parts by weight of the resulting mixture) and then in atmospheric air the temperature of the mixture including the first mixture and the lithium sulfate was increased to 500° C. (at a temperature increase rate of 2° C./min) and the temperature was maintained at 500° C. for 2 hours to perform a second heat treatment process, thereby completing preparation of a positive active material including a core that consists of a collection of primary particles (Li—Ni—Co—Mn-based oxide) and lithium sulfate (the amount of the lithium sulfate was 0.1 parts by weight based on 100 parts by weight of the core). FIGS. 2A and 2B are scanning electron microscopy (SEM) images of a surface of the positive active material. Referring to FIGS. 2A and 2B, lithium sulfate particles are present among primary particles.

Synthesis Example 2

A positive active material including a core that consists of a collection of primary particles and lithium sulfate (the amount of the lithium sulfate was 0.3 parts by weight based on 100 parts by weight of the core) was prepared in the same manner as in Synthesis Example 1, except that the amount of the lithium sulfate mixed with the first mixture was 0.3 parts by weight based on 100 parts by weight of the core.

Synthesis Example 3

A positive active material including a core that consists of a collection of primary particles and lithium sulfate (the amount of the lithium sulfate was 0.5 parts by weight based on 100 parts by weight of the core) was prepared in the same manner as in Synthesis Example 1, except that the amount of the lithium sulfate mixed with the first mixture was 0.5 parts by weight based on 100 parts by weight of the core.

Comparative Synthesis Example A

A positive active material including a core that consists of a collection of primary particles (that is, lithium sulfate was not included) was prepared by performing only the first heat treatment in Synthesis Example 1.

Comparative Synthesis Example B

A positive active material including a core that consists of a collection of primary particles and lithium sulfate (the amount of the lithium sulfate was 0.7 parts by weight based on 100 parts by weight of the core) was prepared in the same manner as in Synthesis Example 1, except that the amount of the lithium sulfate mixed with the first mixture was 0.7 parts by weight based on 100 parts by weight of the core.

Comparative Synthesis Example C

A positive active material including a core that consists of a collection of primary particles and lithium sulfate (the amount of the lithium sulfate was 1 part by weight based on 100 parts by weight of the core) was prepared in the same manner as in Synthesis Example 1, except that the amount of the lithium sulfate mixed with the first mixture was 1 part by weight based on 100 parts by weight of the core.

Comparative Synthesis Example D

A positive active material including a core that consists of a collection of primary particles and lithium sulfate (the amount of the lithium sulfate was 10 parts by weight based on 100 parts by weight of the core) was prepared in the same manner as in Synthesis Example 1, except that the amount of the lithium sulfate mixed with the first mixture was 10 parts by weight based on 100 parts by weight of the core.

Comparative Synthesis Example E

A positive active material including a core that consists of a collection of primary particles and lithium sulfate (the amount of the lithium sulfate was 20 parts by weight based on 100 parts by weight of the core) was prepared in the same manner as in Synthesis Example 1, except that the amount of the lithium sulfate mixed with the resulting mixture was 20 parts by weight based on 100 parts by weight of the core.

Example 1

Natural graphite was mixed with a polyvinylidene fluoride binder in a weight ratio of 96:4 in an N-methylpyrrolidone solvent to prepare a negative electrode slurry. The negative electrode slurry was coated on a copper (Cu) foil to form a thin electrode plate having a thickness of 14 μm, and then the resultant structure was dried at a temperature of 135° C. for 3 hours or more and subjected to pressing, thereby completing manufacturing of a negative electrode.

The positive active material prepared according to Synthesis Example 1, a polyvinylidene fluoride binder, and a carbon conducting agent in a weight ratio of 96:2:2 were dispersed in an N-methylpyrrolidone solvent to prepare a positive electrode slurry. The positive electrode slurry was coated on an aluminum foil to form a thin electrode plate having a thickness of 60 μm, and then the resultant structure was dried at a temperature of 135° C. for 3 hours or more and subjected to pressing, thereby completing manufacturing of a positive electrode.

1.3M $LiPF_6$ was added to a mixed solvent including ethylene carbonate (EC), ethylmethyl carbonate (EMC), and dimethyl carbonate (DMC) in a volumetric ratio of 1:1:1 to prepare an electrolyte. The negative electrode and the positive electrode were wound and pressed using a porous polyethylene (PE) film separator and then placed in a battery case and the electrolyte was loaded into the battery case, thereby completing manufacturing of a lithium battery with a capacity of 2600 mAh.

Example 2

A lithium battery was manufactured in the same manner as in Example 1, except that the positive active material prepared according to Synthesis Example 2 was used.

Example 3

A lithium battery was manufactured in the same manner as in Example 1, except that the positive active material prepared according to Synthesis Example 3 was used.

Comparative Example 1

A lithium battery was manufactured in the same manner as in Example 1, except that the positive active material prepared according to Comparative Synthesis Example A was used.

Comparative Example 2

A lithium battery was manufactured in the same manner as in Example 1, except that the positive active material prepared according to Comparative Synthesis Example B was used.

Comparative Example 3

A lithium battery was manufactured in the same manner as in Example 1, except that the positive active material prepared according to Comparative Synthesis Example C was used.

Comparative Example 4

A lithium battery was manufactured in the same manner as in Example 1, except that the positive active material prepared according to Comparative Synthesis Example D was used.

Comparative Example 5

A lithium battery was manufactured in the same manner as in Example 1, except that the positive active material prepared according to Comparative Synthesis Example E was used.

Evaluation Example

A formation process was performed on the lithium batteries prepared according to Examples 1 to 3 and Comparative Examples 1 to 5 by repeatedly performing a cycle including a charge process and a discharge process three times, wherein one cycle of the charge and discharge process included 4.3 V constant current (CC)/constant voltage (CV) 20 mA cut-off charging the lithium batteries at a charge and discharge rate of 520 mA and 2.75V cut-off discharging the charged lithium batteries at a charge and discharge rate of 520 mA at room temperature.

Lifetime Evaluation

Initial capacities and charge and discharge efficiencies of the lithium batteries prepared according to Examples 1 to 3 and Comparative Examples 1 to 5 were measured after one cycle: the lithium batteries were 4.3 V CC/CV 20 mA cut-off charged at a charge and discharge rate of 2080 mA and then 3V cut-off discharged at a charge and discharge rate of 2600 mA. Then, 100 cycles were performed on each of the lithium batteries and a capacity of each lithium battery at 100 cycles was measured. From the results, a capacity retention rate ((capacity at 100 cycles/initial capacity)×100)(%) was measured and room temperature and lifetime characteristics (100 cycles) were evaluated.

TABLE 1

|   | Amount of lithium sulfate based on 100 parts by weight of core in positive active material | Lifetime characteristics (100 cycles)(%) (at room temperature) | Electrical conductivity | Charge and discharge efficiency |
| --- | --- | --- | --- | --- |
| Example 1 | 0.1 parts by weight | 90% | 5.5*10−2 | 91% |
| Example 2 | 0.3 parts by weight | 89% | 3.5*10−2 | 90.5% |
| Example 3 | 0.5 parts by weight | 88.7% | 2.1*10−3 | 89% |
| Comparative Example 1 | — | 88% | 2.1*10−3 | 88% |
| Comparative Example 2 | 0.7 parts by weight | 87% | 1.9*10−3 | 87% |
| Comparative Example 3 | 1 part by weight | 85% | 1.8*10−3 | 87% |
| Comparative Example 4 | 1.0 parts by weight | 85% | 1.5*10−3 | 82% |
| Comparative Example 5 | 20 parts by weight | 82% | 1.1*10−3 | 75% |

Referring to Table 1, the lithium batteries of Examples 1 to 3 have better lifetime characteristics than the lithium batteries of Comparative Examples 1 to 5.

As described above, according to the one or more of the above embodiments, the positive active materials have excellent thermal stability, excellent high capacity characteristics, and high electrical conductivity. Accordingly, lithium batteries including the positive active materials have excellent electrical characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A positive active material comprising: lithium sulfate and a core that comprises a collection of primary particles, each of which is a compound represented by Formula 1 below:

$$Li_x(Ni_pCo_qMn_r)O_y \qquad \text{<Formula 1>}$$

wherein, $0.95 \leq x \leq 1.05$, $0 < p < 1$, $0 < q < 1$, $0 < r < 1$, $p+q+r=1$, and $0 < y \leq 2.025$, wherein the amount of the lithium sulfate is from about 0.1 parts by weight to about 0.5 parts by weight based on 100 parts by weight of the core.

2. The positive active material of claim 1, wherein the amount of the lithium sulfate is from about 0.1 parts by weight to about 0.3 parts by weight based on 100 parts by weight of the core.

3. The positive active material of claim 1, wherein the lithium sulfate is present in a particle form and the lithium sulfate particles exist among the primary particles of the core.

4. The positive active material of claim 1, wherein $1 \leq x \leq 1.05$, $0.5 \leq p \leq 0.6$, $0.2 \leq q \leq 0.3$, and $0.1 \leq r \leq 0.3$.

5. The positive active material of claim 1, wherein $x=1$, $p=0.5$, $q=0.2$, $r=0.3$, and $y=2$, or $x=1.05$, $p=0.6$, $q=0.2$, $r=0.2$, and $y=2$.

6. A lithium battery comprising:
a positive electrode comprising the positive active material of claim 1;
a negative electrode comprising a negative active material; and an electrolyte.

* * * * *